US010203059B2

(12) United States Patent
Chuang

(10) Patent No.: US 10,203,059 B2
(45) Date of Patent: Feb. 12, 2019

(54) DUAL-AIR TAP INFLATION NOZZLE FOR INFLATION PUMP

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 58 days.

(21) Appl. No.: 15/238,753

(22) Filed: Aug. 17, 2016

(65) Prior Publication Data

US 2017/0152982 A1   Jun. 1, 2017

(30) Foreign Application Priority Data

Nov. 27, 2015   (TW) .............................. 104139790 A

(51) Int. Cl.
*F16L 37/18* (2006.01)
*B60S 5/04* (2006.01)
*F16K 15/20* (2006.01)

(52) U.S. Cl.
CPC ............... *F16L 37/18* (2013.01); *B60S 5/04* (2013.01); *F16K 15/20* (2013.01); *Y10T 137/3724* (2015.04)

(58) Field of Classification Search
CPC .. F16L 37/18; B60S 5/04; F16K 15/20; Y10T 137/3724
USPC .......................................................... 137/141
See application file for complete search history.

(56) References Cited

U.S. PATENT DOCUMENTS

| 5,666,990 A * | 9/1997 | Wu ........................... B60S 5/04 137/223 |
| 5,921,269 A * | 7/1999 | Wu ........................... B60S 5/04 137/223 |
| 8,360,090 B2 * | 1/2013 | Wang ..................... F16K 11/056 137/119.06 |
| 8,402,987 B2 * | 3/2013 | Wang ....................... B60S 5/043 137/223 |
| 8,839,809 B1 * | 9/2014 | Wang .................... F04B 33/005 137/223 |
| 9,249,914 B2 | 2/2016 | Kuo |

FOREIGN PATENT DOCUMENTS

| CN | 2680895 Y | 2/2005 |
| CN | 201434123 Y | 3/2010 |
| CN | 102444729 A | 5/2012 |
| CN | 102606765 A | 7/2012 |
| CN | 103836239 A | 6/2014 |
| TW | 201111668 A | 4/2011 |
| TW | I373580 B | 10/2012 |
| TW | M449885 U | 4/2013 |
| TW | M474075 U | 3/2014 |

* cited by examiner

*Primary Examiner* — William McCalister
*Assistant Examiner* — Patrick Williams
(74) *Attorney, Agent, or Firm* — Alan D. Kamrath; Kamrath IP Lawfirm, P.A.

(57) ABSTRACT

A dual-air tap inflation nozzle includes a body, a first cap assembly, a second cap assembly, a slidable valve slidably disposed in the body, and a lever member. The body has a first end, a second end, a first passage and a second passage in communication to the first passage. The first cap assembly is mounted to the first end and has a third diameter. The second cap assembly is mounted to the second end and has a fourth diameter larger than the third diameter. The lever member is abutable against the slidable valve to cause the second passage to move in relation to the first passage. Thus, the second passage is in communication with a first inflatable space or a second inflatable space of the body.

9 Claims, 6 Drawing Sheets

DUAL-AIR TAP INFLATION NOZZLE FOR INFLATION PUMP

BACKGROUND OF THE INVENTION

The present invention relates to an inflation nozzle and, more particularly, to a dual-air tap inflation nozzle for an inflation pump.

Taiwan Patent No. 1373580 discloses a dual-air tap inflation connector capable of improving air-leakage including a dual-opening cylinder, a thimble member, and a shifting element. Outer peripheries of two ends of the dual-opening cylinder are formed with outer threaded portions respectively threadedly connected with a first cap and a second cap. The thimble member is housed in a containing hole of the dual-opening cylinder and moves relative to the containing hole of the dual-opening cylinder. A first end of the thimble member is provided with a first O-ring, and a second end of the thimble member is provided with a second O-ring. The thimble member has a perforation between the first end and the second end. The shifting element includes an eccentric block capable of pushing the thimble member to move leftwards/rightwards. Furthermore, two ends of the eccentric block are provided with two sealing rings. When the shifting element is not turned, a first inflation space and a second inflation space of the thimble member are not in communication with each other, and the second inflation space communicates with a channel of the dual-opening cylinder.

However, it is difficult for a user to distinguish the first cap adapted to connect with a Schrader valve and the second cap adapted to connect with a Presta valve due to the same appearances of the first and second caps. Using an unsuitable valve to connect to the unsuitable cap will damage the structure of the inflation connector.

The present invention is, therefore, intended to obviate or at least alleviate the problems encountered in the prior art.

BRIEF SUMMARY OF THE INVENTION

The present invention solves this need and other problems in the field of inflation nozzles by providing a dual-air tap inflation nozzle including a body, a first cap assembly, a second cap assembly, a slidable valve, and a lever member.

The body has a first end and a second end spaced from each other along a first axis. The body includes a first passage and a second passage in communication with each other. The first passage penetrates through the first and second ends of the body along the first axis. The first passage includes a first section and a second section disposed on two opposite ends thereof along the first axis.

The first cap assembly includes a first cap mounted to the first end of the body and having a third diameter.

The second cap assembly includes a second cap mounted to the second end of the body and having a fourth diameter larger than the third diameter.

The slidable valve is slidably disposed in the first passage. The slidable valve includes a first venting portion slidably disposed in the first section of the first passage, a second venting portion slidably disposed in the second section of the first passage, and a pushing hole penetrating through the slidable valve. A first inflatable space is formed between the first section, the first cap assembly, and the first venting portion, and a second inflatable space is formed between the second section, the second cap assembly, and the second venting portion.

The lever member includes an eccentric portion pivotally mounted to the body and is inserted into the pushing hole of the slidable valve. The eccentric portion is abutable against the pushing hole to cause the second passage to move in relation to the first passage. The second passage is in communication with the first inflatable space or the second inflatable space.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
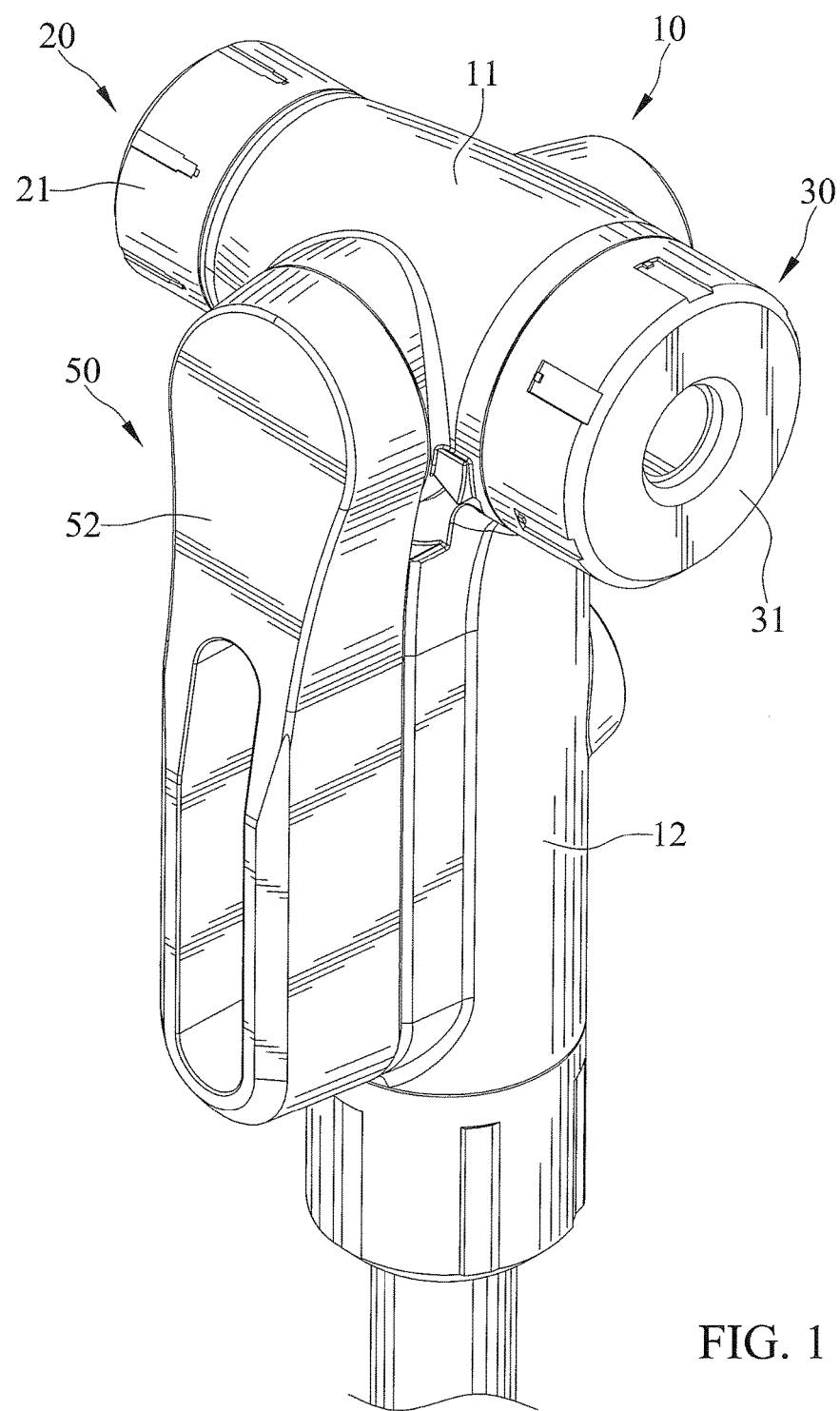
FIG. 1 shows a perspective view of a dual-air tap inflation nozzle according to the present invention.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "first", "second", "third", "fourth", "end", "portion", "longitudinal", "radial", "diameter", "width", "thickness", and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

Figure 2:
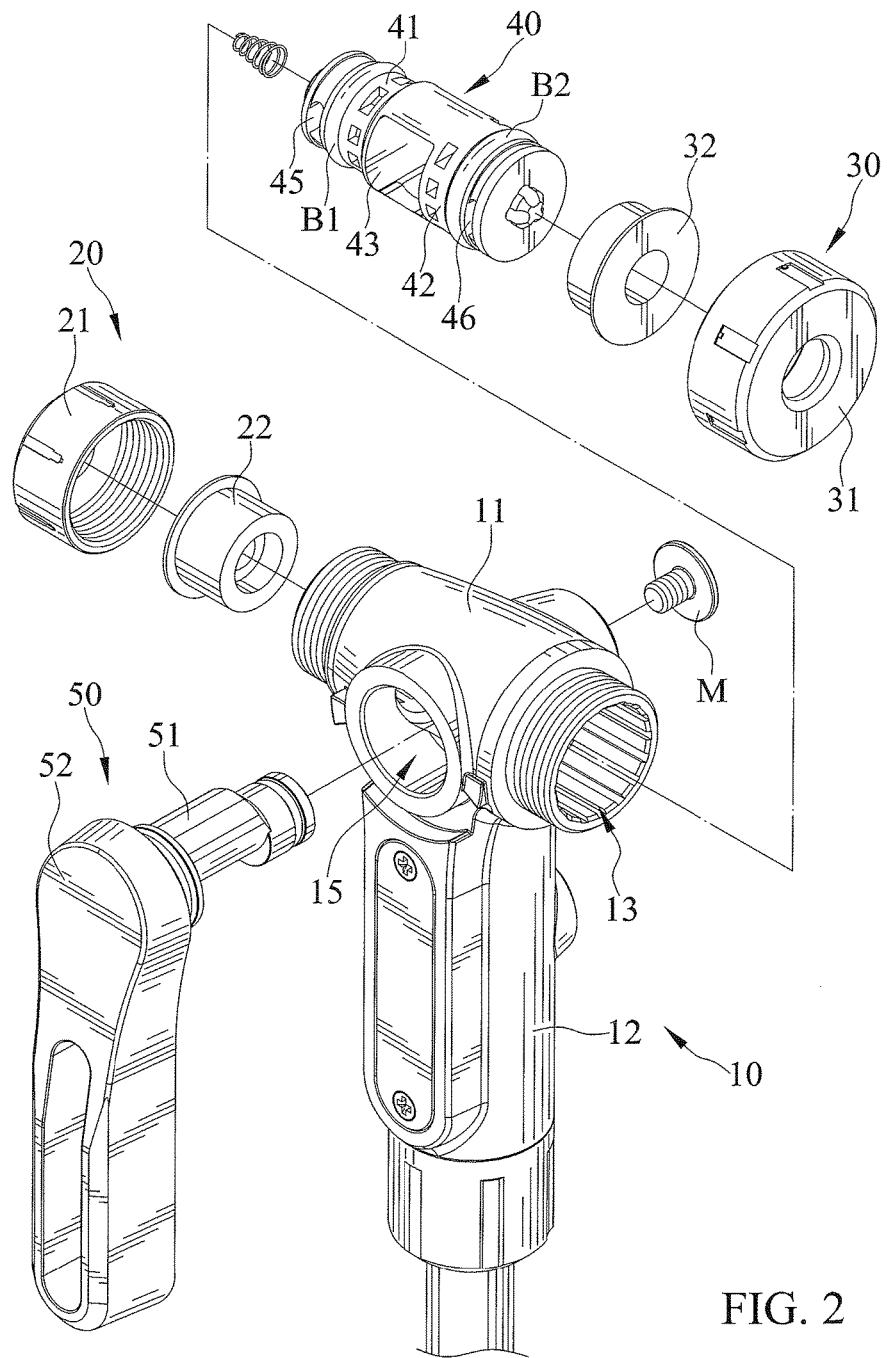
FIG. 2 shows an exploded, perspective view of the dual-air tap inflation nozzle of FIG. 1.
Figure 3:
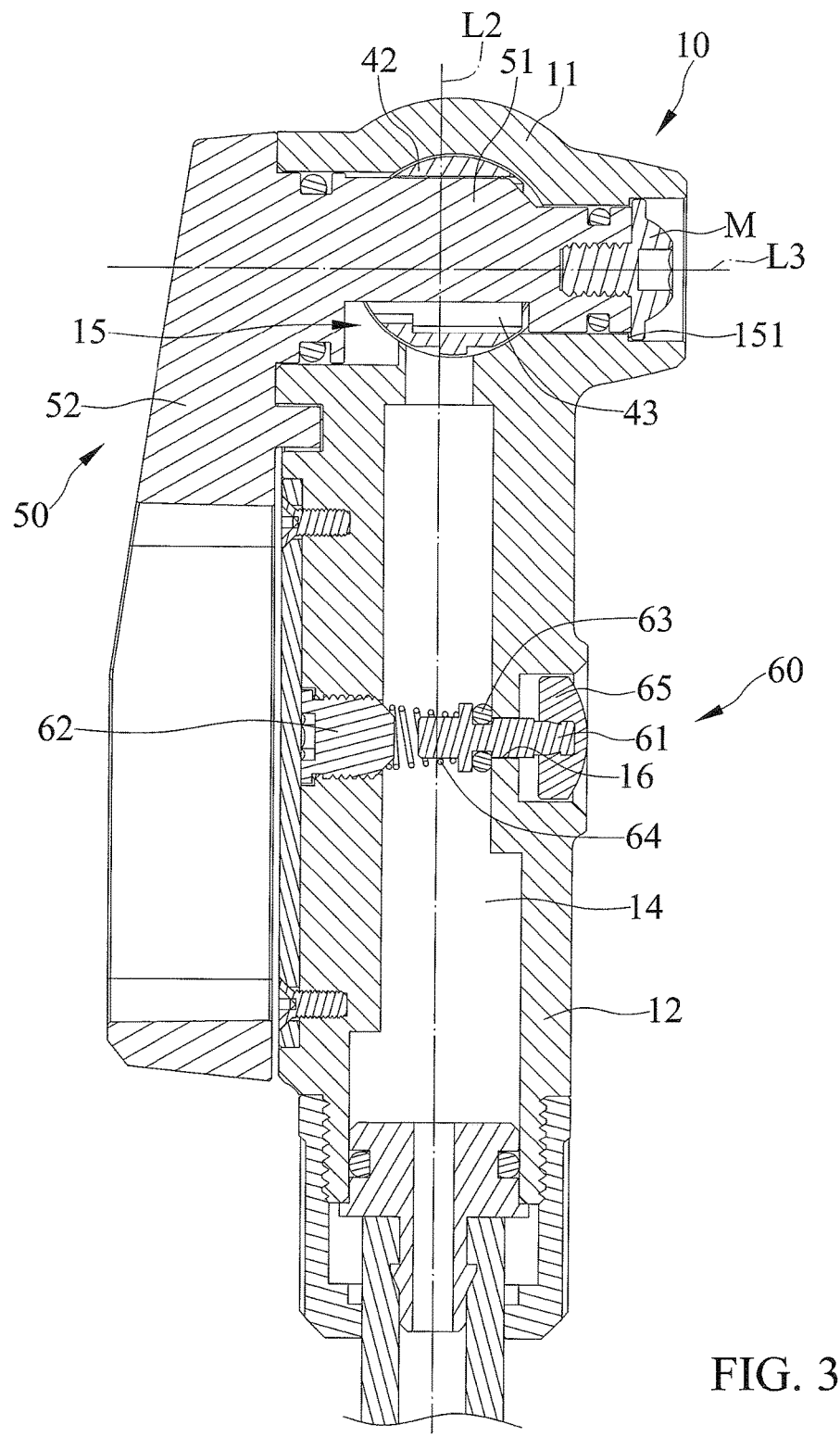
FIG. 3 shows a cross-section view of the dual-air tap inflation nozzle of FIG. 1.
Figure 4:
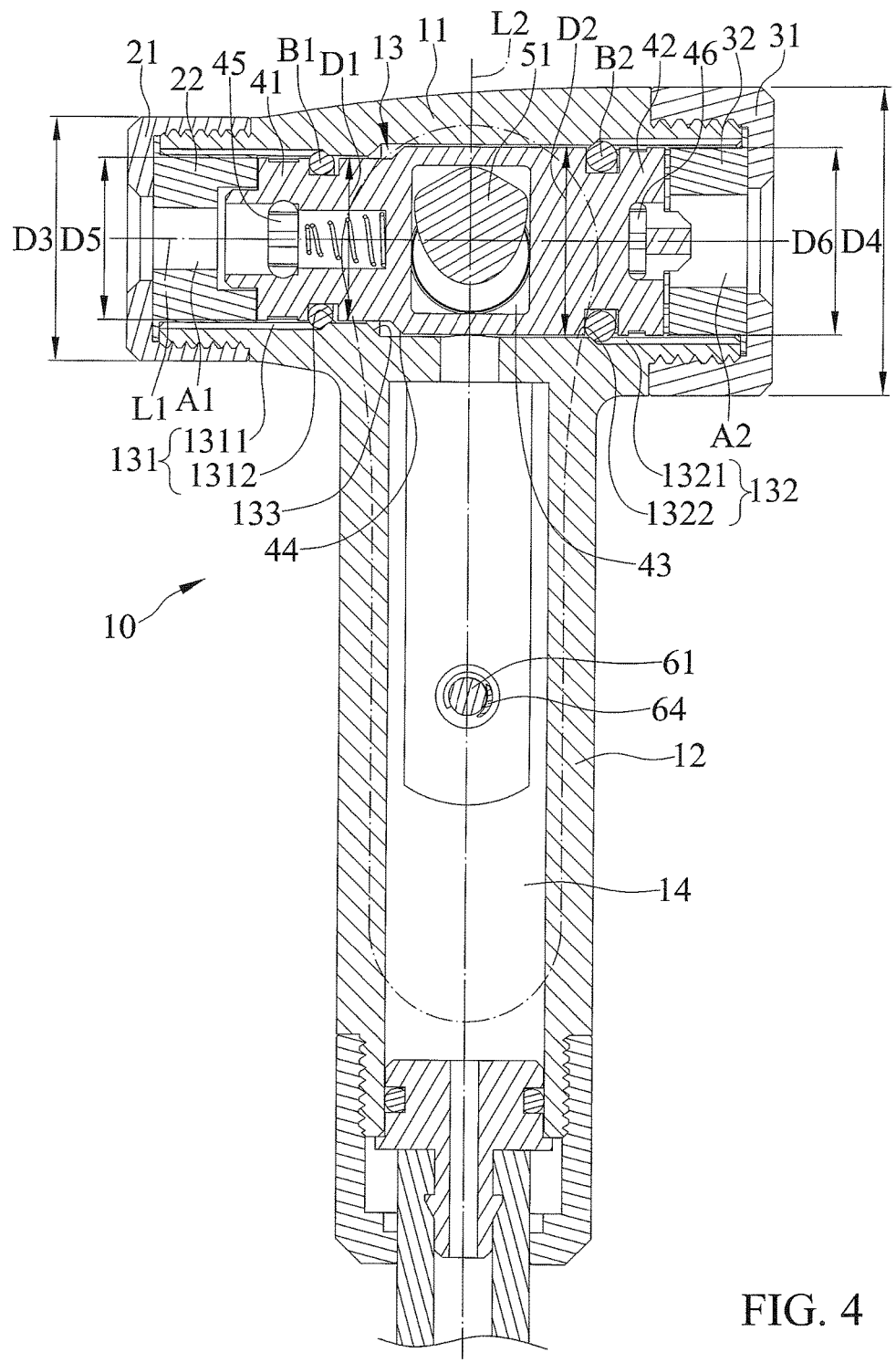
FIG. 4 shows another cross-section view of the dual-air tap inflation nozzle of FIG. 1, with the broken line indicating a lever.
Figure 5:
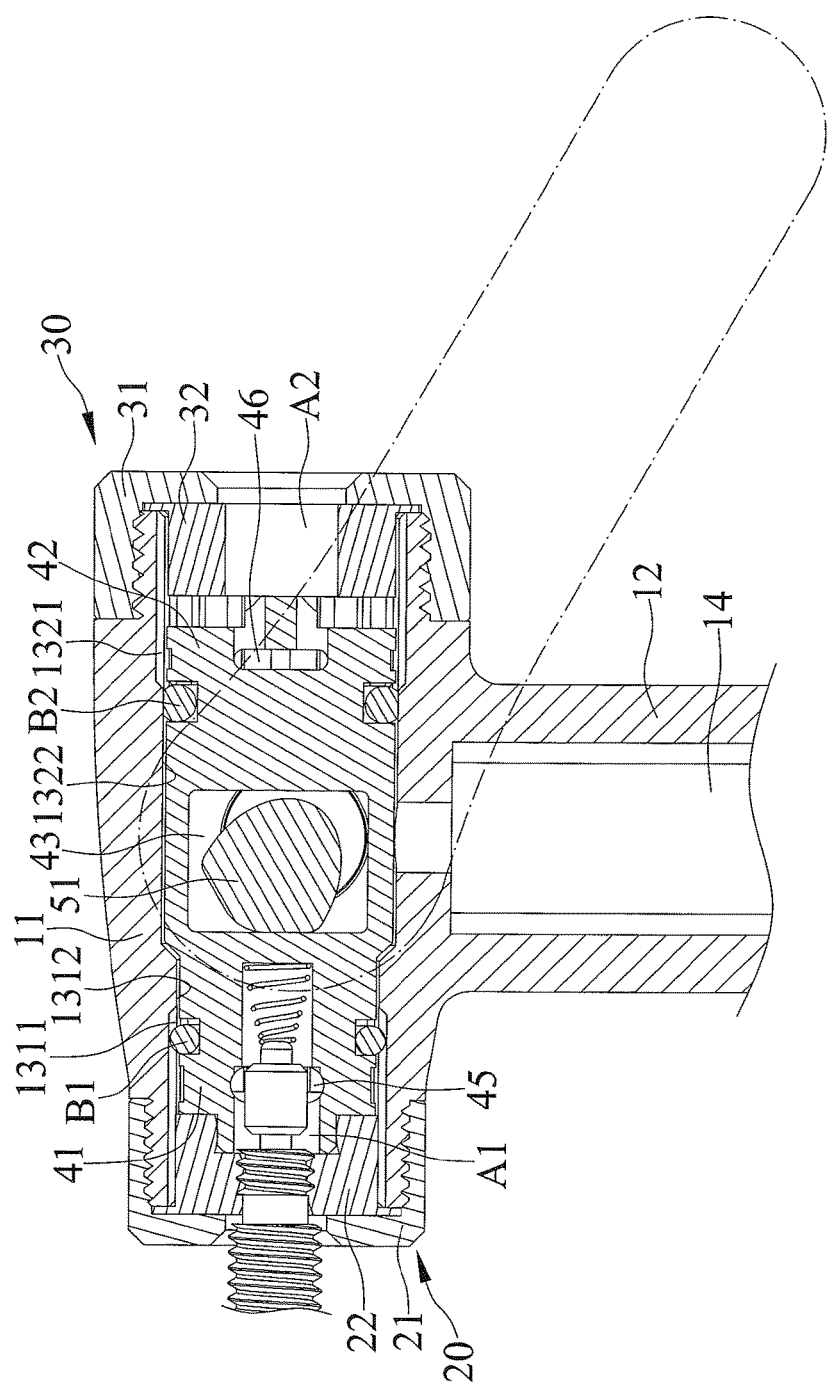
FIG. 5 shows a continued view of the dual-air tap inflation nozzle of FIG. 4, and illustrates the dual-air tap inflation nozzle connected with a Presta valve.
Figure 6:
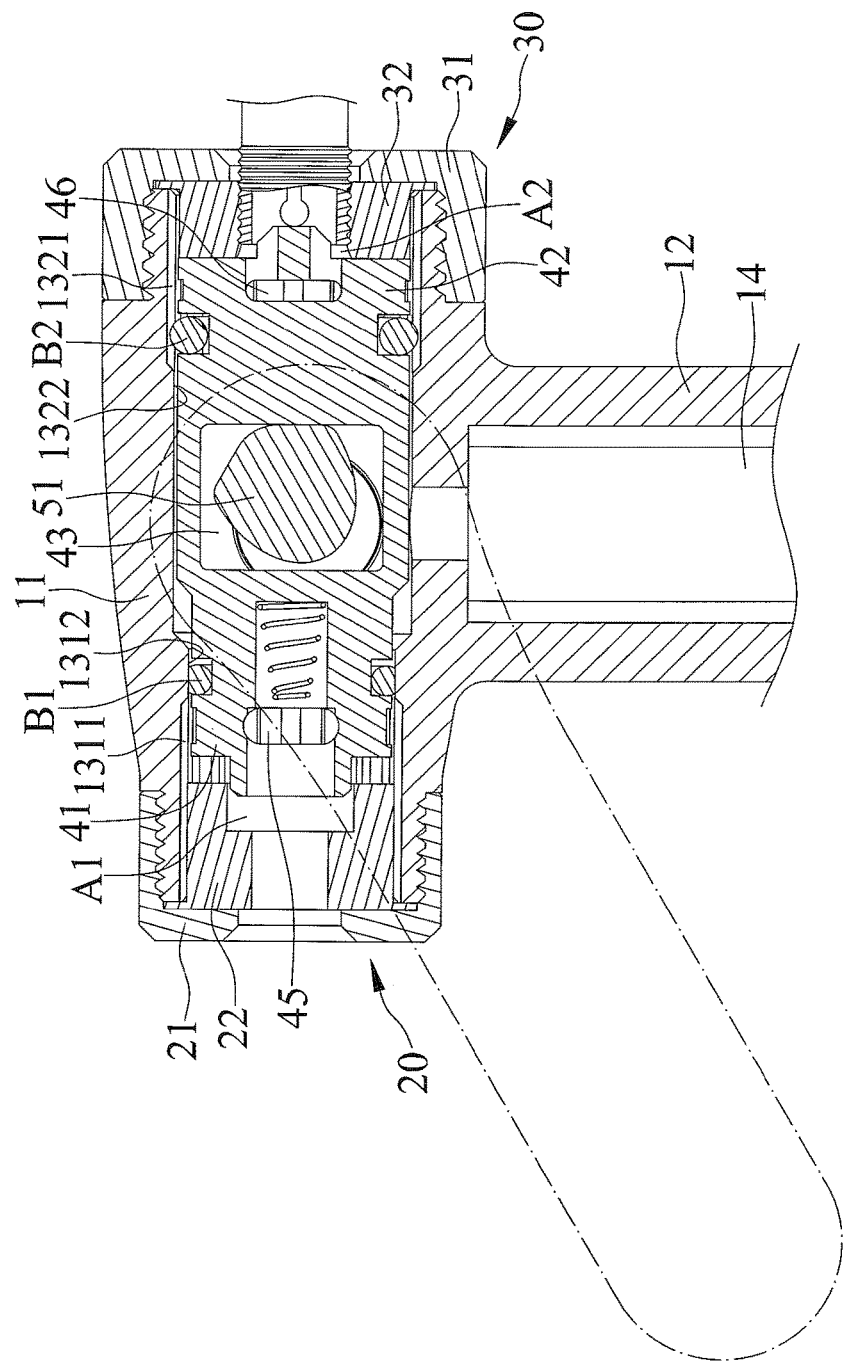
FIG. 6 shows another continued view of the dual-air tap inflation nozzle of FIG. 4, and illustrates the dual-air tap inflation nozzle connected with a Schrader valve.

FIGS. 1-6 show a dual-air tap inflation nozzle according to the present invention. The dual-air tap inflation nozzle includes a body 10, first and second cap assemblies 20 and 30 mounted on two opposite ends of body 10, a slidable valve 40 slidably disposed in body 10, a lever member 50 pivotally mounted to body 10 to abut against slidable valve 40, and an exhaust valve 60 mounted in body 10 for exhausting compressed air from body 10. A first inflatable space A1 is formed between body 10, first cap assembly 20, and slidable valve 40 and is adapted for connecting to a Presta valve. A second inflatable space A2 is formed between body 10, second cap assembly 30, and slidable valve 40 and is adapted for connecting to a Schrader valve.

Body 10 has a first end and a second end spaced from each other along a first axis L1. Body 10 includes a first rod portion 11 extending along first axis L1, a second rod portion 12 connected to first rod portion 11 and extending along a second axis L2 perpendicular to first axis L1, and a first passage 13 and a second passage 14 in communication with each other. First and second cap assemblies 20 and 30 are respectively mounted on two opposite ends of first rod portion 11. An end of second rod portion 12 opposite to first rod portion 11 is adapted to be attached with an inflation pump. First passage 13 penetrates through two opposite ends of first rod portion 11 of body 10 along first axis L1.

First passage 13 includes a first section 131 and a second section 132 disposed on two opposite ends thereof along first axis L1. In the embodiment, first section 131 has a first diameter D1, and second section 132 has a second diameter D2 larger than first diameter D1. First passage 13 further includes a first stepped portion 133 located between first section 131 and second section 132 and tapered from second section 132 to first section 131. First section 131 includes a first ventilating groove 1311 and a first smoothing portion 1312 formed in an inner periphery thereof. First ventilating groove 1311 extends toward first cap assembly 20 along first axis L1. First smoothing portion 1312 is located between first ventilating groove 1311 and first stepped portion 133. Second section 132 includes a second ventilating groove 1321 and a second smoothing portion 1322 formed in an inner periphery thereof. Second ventilating groove 1321 extends toward second cap assembly 30 along first axis L1. Second smoothing portion 1322 is located between second ventilating groove 1321 and first stepped portion 133.

Second passage 14 is formed in second rod portion 12 and extends along second axis L2 to in communication with first passage 13. Second passage 14 can be in in communication with the inflation pump when second rod portion 12 is attached with the inflation pump. Thus, compressed air generated by the inflation pump can flow into second passage 14.

Body 10 further includes an assembling hole 15, and an exhaust hole 16. Assembling hole 15 penetrates through first rod portion 11 along a third axis L3 perpendicular to second axis L2 and is in communication with first passage 13. Exhaust hole 16 penetrates through two opposite ends of second rod portion 12 and is in communication with second passage 14. Exhaust hole 16 is parallel to assembling hole 15. In the embodiment, a periphery of first rod portion 11 is tapered from the second end to the first end of body 10. Assembling hole 15 includes a shoulder portion 151 formed around a periphery thereof and located at one side of first passage 13.

First cap assembly 20 is located adjacent to first section 131 and includes a first cap 21 and a first elastic member 22. First cap 21 is threadedly mounted to first end of body 10 and has a third diameter D3. First elastic member 22 is received in first section 131. One end of first elastic member 22 abuts against first cap 21, and another end of first elastic member 22 abuts against slidable valve 40. A Presta valve can be inserted through first cap 21 and first elastic member 22 to be received in first inflatable space A1. In the embodiment, first elastic member 22 is formed with a cylinder shape and extends along first axis L1.

Second cap assembly 30 is located adjacent to second section 132 and includes a second cap 31 and a second elastic member 32. Second cap 31 is threadedly mounted to second end of body 10 and has a fourth diameter D4 larger than third diameter D3. In a preferred form, fourth diameter D4 is 1.1-2 times larger than third diameter D3. In the embodiment, fourth diameter D4 is 1.2-1.3 times larger than third diameter D3. Moreover, third diameter D3 is 19 mm, and fourth diameter D4 is 24 mm. Second elastic member 32 is received in second section 132. One end of second elastic member 32 abuts against second cap 31, and another end of second elastic member 32 abuts against slidable valve 40. A Schrader valve can be inserted through second cap 31 and second elastic member 32 to be received in second inflatable space A2. In the embodiment, second elastic member 32 is formed with a cylinder shape and extends along first axis L1.

Slidable valve 40 is slidably disposed in first passage 13 and includes a first venting portion 41 slidably disposed in first section 131, a second venting portion 42 slidably disposed in second section 132, and a pushing hole 43 penetrating therethrough. First venting portion 41 and second venting portion 42 are arranged at two opposite ends of slidable valve 40 along first axis L1. First venting portion 41 has a fifth diameter D5. Second venting portion 42 has a sixth diameter D6 larger than fifth diameter D5 and larger than first diameter D1. Pushing hole 43 penetrates through one side of second venting portion 42 adjacent to first venting portion 41.

Slidable valve 40 further includes a second stepped portion 44, a first vent hole 45, and a second vent hole 46. Second stepped portion 44 is circumferencely formed on an outer periphery of slidable valve 40 and is located between first venting portion 41 and second venting portion 42. Second stepped portion 44 tapered from second venting portion 42 to first venting portion 41.

First vent hole 45 penetrates through first venting portion 41 along a radial direction perpendicular to first axis L1 and is in communication with first inflatable space A1 and first ventilating groove 1311. Second vent hole 46 penetrates through second venting portion 42 along a radial direction perpendicular to first axis L1 and is in communication with second inflatable space A2 and second ventilating groove 1321.

A first sealing member B1 is disposed around an outer periphery of first venting portion 41 and is located between second stepped portion 44 and first vent hole 45. First sealing member B1 is slidably received in first section 131 to be slidable between first ventilating groove 1311 and first smoothing portion 1312.

A second sealing member B2 is disposed around an outer periphery of second venting portion 42 and is located between second stepped portion 44 and second vent hole 46. Second sealing member B2 is slidably received in second section 132 to be slidable between second ventilating groove 1321 and second smoothing portion 1322.

Lever member 50 includes an eccentric portion 51 and a shifting portion 52 connected with each other. Eccentric portion 51 is pivotally mounted to assembling hole 15 along third axis L3 and is inserted into pushing hole 43 to be abutable against pushing hole 43 to cause slidable valve 40 to move in relation to first passage 13. Shifting portion 52 extends along a radial direction perpendicular to third axis L3. A user can push shifting portion 52 to cause eccentric portion 51 to pivot with respect to body 10 about third axis L3. A fastening member M is connected to one side of eccentric portion 51 opposite to shifting portion 52 and is received into assembling hole 15. Fastening member M abuts against shoulder portion 151 to position lever member 50 to body 10.

Exhaust valve 60 is mounted to second rod portion 12. Exhaust valve 60 includes a rod member 61, a plug member 62, an airtight member 63, a biasing member 64, and a button member 65. Rod member 61 is slidably inserted through exhaust hole 16. Plug member 62 is threadedly mounted in exhaust hole 16. Airtight member 63 is mounted around rod member 61 for sealing second passage 14.

Biasing member 64 is disposed in second passage 14, and two opposite ends of biasing member 64 elastically abut against rod member 61 and plug member 62. Button member 65 is mounted to one end of rod member 61. The user can push button member 65 to exhaust compressed air from second passage 14.

Lever member 50 can be operated in first, second, and third positions. When lever member 50 is in the first position, eccentric portion 51 does not abut against slidable valve 40 to cause first sealing member B1 to contact one side of first ventilating groove 1311 and to cause second sealing member B2 to contact one side of second ventilating groove 1321. Compressed air flows into a part of second passage 14 adjacent to first and second smoothing portions 1312 and 1322, flows through first and second sealing members B1 and 132 into first and second ventilating grooves 1311 and 1321, and continually flows into first and second inflatable spaces A1 and A2.

When lever member 50 is in the second position and a Presta valve is connected to first inflatable space A1, eccentric portion 51 abuts against slidable valve 40 to move toward first cap assembly 20. First sealing member B1 is located in first ventilating groove 1311, and second sealing member B2 is located in second smoothing portion 1322. First elastic member 22 is compressed by slidable valve 40 to tighten with the Presta valve. Compressed air flows into second passage 14, and flows through first section 131, first vent hole 45, and first inflatable space A1 into the Presta valve. Compressed air cannot flow through second sealing member B2 into second inflatable space A2.

When lever member 50 is in the third position and a Schrader valve is connected to second inflatable space A2, eccentric portion 51 abuts against slidable valve 40 to move toward second cap assembly 30. First sealing member B1 is located in first smoothing portion 1312, and second sealing member B2 is located in second ventilating groove 1321. Second elastic member 32 is compressed by slidable valve 40 to tighten with the Schrader valve. Compressed air flows into second passage 14, and flows through second section 132, second vent hole 46, and second inflatable space A2 into the Schrader valve. Compressed air cannot flow through first sealing member B1 into first inflatable space A1.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A dual-air tap inflation nozzle comprising:
a body having a first end and a second end spaced from each other along a first axis, with the body including a first passage and a second passage in communication with each other, with the first passage having a cylindrical shape extending between and penetrating through the first and second ends of the body along the first axis, with the cylindrical shape of the first passage including a first section and a second section disposed at two opposite ends of the first passage along the first axis, with the second section disposed between the first section and the second end, with the cylindrical shape of the first section of the first passage having a first diameter, with the cylindrical shape of the second section of the first passage having a second diameter larger than the first diameter;
a first cap mounted to the first end of the body, having a first opening, and having a maximum, third diameter;
a second cap mounted to the second end of the body, having a second opening, and having a maximum, fourth diameter larger than the maximum, third diameter;
a slidable valve having an outer periphery slidably abutting the cylindrical shape of the first passage, with the slidable valve including a first venting portion including the outer periphery of the slideable valve slidably abutting the first diameter of the first section of the first passage, a second venting portion including the outer periphery of the slideable valve slidably abutting the second diameter of the second section of the first passage, and a pushing hole penetrating therethrough, with the outer periphery of the first venting portion having a fifth diameter, and with the outer periphery of the second venting portion having a sixth diameter larger than the fifth diameter and larger than the first diameter, with a first inflatable space formed between the first section, the first cap assembly, and the first venting portion, with a second inflatable space formed between the second section, the second cap assembly, and the second venting portion; and
a lever member including an eccentric portion pivotally mounted to the body and inserted into the pushing hole of the slidable valve, with the eccentric portion abutable against the pushing hole to cause the second passage to move in relation to the first passage, and with the second passage in communication with the first inflatable space or the second inflatable space.

2. The dual-air tap inflation nozzle as claimed in claim 1, with the body including a first rod portion extending along the first axis, and a second rod portion connected to the first rod portion and extending along a second axis perpendicular to the first axis, with the first passage penetrating through the first rod portion along the first axis, with a periphery of the first rod portion tapered from the second end to the first end of the body, and with the second passage formed in the second rod portion.

3. The dual-air tap inflation nozzle as claimed in claim 2, with the fourth diameter 1.1-2 times larger than the third diameter.

4. The dual-air tap inflation nozzle as claimed in claim 3, with the fourth diameter 1.2-1.3 times larger than the third diameter.

5. The dual-air tap inflation nozzle as claimed in claim 1, with the cylindrical shape of the first passage including a first stepped portion extending contiguously between the first section and the second section, with the first stepped portion of the passage tapered from the second section of the passage to the first section of the passage, with the outer periphery of the slidable valve including a second stepped portion and extending between the first venting portion and the second venting portion, and with the second stepped portion tapered from the second venting portion to the first venting portion.

6. The dual-air tap inflation nozzle as claimed in claim 1, with the first cap assembly located adjacent to the first section, with the second cap assembly located adjacent to the second section, and with the pushing hole penetrating through one side of the second venting portion adjacent to the first venting portion.

7. The dual-air tap inflation nozzle as claimed in claim 6, with the first section of the first passage including a first ventilating groove and a first smoothing portion formed in an inner periphery thereof, with the first ventilating groove extending toward the first cap assembly along the first axis, with the first smoothing portion located between the first ventilating groove and the second section, with the second section of the first passage including a second ventilating groove and a second smoothing portion formed in an inner periphery thereof, with the second ventilating groove extending toward the second cap assembly along the first axis, with the second smoothing portion located between the second ventilating groove and the first section, with a first sealing member disposed around an outer periphery of the first venting portion of the slidable valve and slidably received in the first section of the first passage to be slidable between the first ventilating groove and the first smoothing portion, and with a second sealing member disposed around an outer periphery of the second venting portion of the slidable valve and slidably received in the second section of the first passage to be slidable between the second ventilating groove and the second smoothing portion.

8. The dual-air tap inflation nozzle as claimed in claim 7, with the slidable valve including a first vent hole and a second vent hole, with the first vent hole penetrating through the first venting portion and in communication with the first inflatable space and the first ventilating groove, and with the second vent hole penetrating through the second venting portion and in communication with the second inflatable space and the second ventilating groove.

9. The dual-air tap inflation nozzle as claimed in claim 8, with the first cap assembly further including a first elastic member received in the first passage, with one end of the first elastic member abutting against the first cap, with another end of the first elastic member abutting against the slidable valve, with the second cap assembly further including a second elastic member received in the first passage, with one end of the second elastic member abutting against the second cap, and with another end of the second elastic member abutting against the slidable valve.

* * * * *